Dec. 5, 1933.    R. B. TOWNSEND    1,937,997
WELDED BRAKE SHOE
Filed Sept. 15, 1930
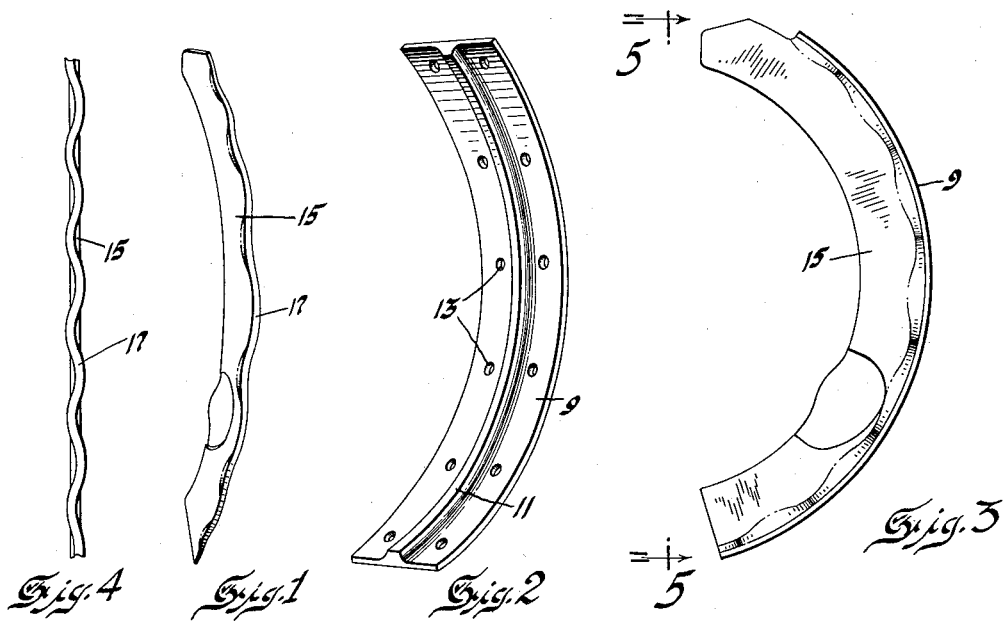
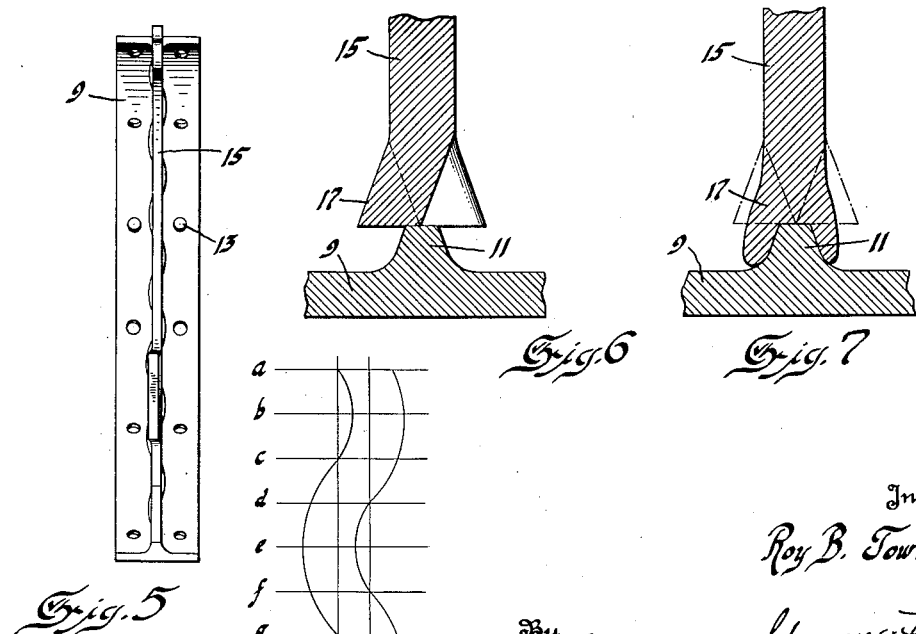
Inventor
Roy B. Townsend Patented Dec. 5, 1933

1,937,997

UNITED STATES PATENT OFFICE 1,937,997

WELDED BRAKE SHOE

Roy B. Townsend, Detroit, Mich., assignor to General Motors Corporation, Detroit, Mich., a corporation of Delaware Application September 15, 1930
Serial No. 481,924

7 Claims. (Cl. 219—10)

This invention relates to brakes and particularly to brake shoes used for frictionally engaging the drums of internal expanding brakes.

An object of the invention is to make a brake shoe possessing a high degree of efficiency in operation and economy in manufacture.

A further and more specific object is to produce a brake shoe from two parts, a lining-carrying flange and a reinforcing blade, the parts being welded together.

A still further object is to improve the union between two such parts and to reduce to a minimum the time required to weld the parts together.

Other objects and advantages will be in part obvious and in part understood from the following description.

The description is associated with an accompanying drawing in which—

Fig. 1 is a perspective of the blade of the shoe.

Fig. 2 is a perspective of the lining-carrying flange.

Fig. 3 is a side view of the completed shoe.

Fig. 4 is a development of a portion of that edge of the blade which is to contact with the flange.

Fig. 5 is a view of the shoe as seen from line 5—5 of Fig. 3.

Fig. 6 is a view in section showing the blade and flange in assembled relation but before being welded.

Fig. 7 is a view in section showing the blade and flange welded together, the section being spaced from the section shown by Fig. 6.

Fig. 8 is a diagrammatic view.

Referring by reference characters to the drawing, numeral 9 is used to represent the lining-carrying part of the shoe. It is formed with a short radial web 11 whereby a better weld is produced than if it were attempted to weld the blade to the surface of the flange. At 13 are shown holes to receive rivets designed to secure the brake lining to the flange. The blade is represented by numeral 15. It is a stamping of arc shape, the curvature of its outer edge corresponding with the curvature of the web of the lining-carrying flange. The blade is preferably thicker than the web. In the form shown by the drawing it is of twice the thickness of the edge of the web which it is to contact. The edge of the blade is also formed with a series of lateral waves, the waves on one side alternating with those on the other side and constituting a sinuous edge. This waving edge produces at its crests the part 17 which overhangs the edge of the web, the overhanging parts alternating on opposite sides along the length of the arc. It will be observed, however, that even at the point of greatest overhanging the wave is not of such amplitude as to interrupt the contact between the blade and the web. Preferably at this point only about one-half of the transverse dimension of the web is out of contact with the blade. There is therefore a continuous region of contact throughout the length of the web between the edges of the web and blade, but portions of the web along the arc are out of contact, thereby reducing the area of contact below the area which would occur were the sinuous form of blade omitted.

The welding may be effected by using the blade and flange as electrodes. Since the area of contact is reduced as a result of the formation of the blade as explained above, the time required to weld the contacting faces is less than it would otherwise be. When the blade and flange are pressed together and the welding operation takes place the portions 17 of the blade overhanging the sides of the web slide down along the sides and form a sort of wall, adding materially to the rigidity of the finished shoe. The walls will not be continuous and uniform throughout as will be obvious. There will be points of maximum thickness corresponding with the position shown at $b$ and $e$ of Fig. 8. These points occur alternately on opposite sides. The regions of considerable overhanging as between $a$ and $c$ and between $e$ and $f$ are also the regions where the blade and web are out of contact, these regions also alternating, being first on one side and then on the other. However, because of the space between $c$ and $d$ and between $f$ and $g$ it will be seen that the weld will be continuous throughout the length of the web. It will also be seen that the overhanging portion at the right beginning at $d$ begins before the overhanging portion at the left ending at $c$ ends. Portions of the web therefore will be walled on both sides by material from the blade.

Fig. 6 shows a position before welding and corresponds roughly to point $e$ of Fig. 8. When the parts are welded a wall of maximum thickness will be formed against the side of the web opposite the area which lies outside the region of contact between the web and blade.

Fig. 7 illustrates the condition after welding at a point somewhere between $c$ and $d$ or between $f$ and $g$ where there is an overhang on both sides and where in consequence the material from the blade has walled in both sides of the web. It will be understood that the thickness of the wall in these regions varies, the variation on the two sides being in the reverse order.

When the two parts are welded together the regions normally out of contact as in Fig. 6 and between $a$ and $c$ and between $f$ and $g$ in Fig. 8 may receive molten metal from the process of welding. The material from the relatively thicker blade may settle down on the web. This may wholly or partly fill the area under consideration. Even if an effective weld is not produced in this region the union is nevertheless improved as a result thereof.

I claim:

1. A brake shoe formed of two parts, a flange having a radial web, and a blade, the blade and web welded together in edge to edge relation, the blade shaped at its edge to have parts alternately laterally overlapping opposite side walls of the web.

2. The invention defined by claim 1, the medial longitudinal line of the edges of the blade and web being substantially coincident.

3. A brake shoe formed from two parts, a flange having a radial web, and a blade, the parts secured together in edge to edge relation, the blade having overhanging portions engaging the side walls of the web, adjacent overhanging portions engaging opposite side walls.

4. The invention defined by claim 3, said portions having minimum transverse dimensions at their ends and maximum transverse dimensions at points between their ends.

5. The invention defined by claim 3, the transverse dimension of the blade exceeding that of the web.

6. A brake shoe comprising a lining-carrying flange with a radial web, a blade welded to the web in edge to edge relation, portions of said blade overlapping the edge of the web and engaging the sides of the web when the parts are welded.

7. The method of making brake shoes consisting in forming a lining-carrying part with a radial web, constructing a reinforcing blade with one edge in the form of a sinuous curve, and welding said blade to said web with the sinuous curved edge in contact with said web.

ROY B. TOWNSEND.